Feb. 1, 1966 J. R. SCHNEIDER, JR 3,232,570
HOLDERS FOR GARDEN HOSES
Filed June 22, 1964

INVENTOR
JOSEPH R. SCHNEIDER, JR
BY
ATTORNEY

{ # United States Patent Office

3,232,570
Patented Feb. 1, 1966

3,232,570
HOLDERS FOR GARDEN HOSES
Joseph R. Schneider, Jr., 16 Pheasant Lane,
St. Paul, Minn.
Filed June 22, 1964, Ser. No. 376,936
7 Claims. (Cl. 248—87)

This invention relates to improvements in holders for flexible lawn and garden hoses of the soaker type having a multiplicity of spray apertures formed in the normally upper side of the hose and particularly to holders for hoses of thin and relatively wide cross-sectional shape which are difficult to retain flat on the ground so that the apertures direct the spray substantially perpendicularly to the ground surface. Retaining such hoses flat on the ground is particularly difficult when the hose must be bent laterally around plants, trees, shrubbery and other obstacles.

It is an object of my invention to provide improved holders consisting of supporting members spaced along the hose and ground penetrating members adapted to anchor the supporting members in selected positions whereby the hose is anchored against tilting or twisting laterally relative to the supporting members.

A particular object is to provide supporting and anchoring means of the class described wherein the supporting members are substantially rigid and wide enough longitudinally of the hose to maintain stability when used on soft, cultivated ground, being formed with perforations spaced from the hose at opposite sides thereof to receive ground penetrating members for engaging and confining the supporting members in selected positions.

My invention also includes certain novel other features of construction which will be more fully pointed out in the following specification and claims.

The invention will be best understood by reference to the accompanying drawing in which.

Figure 1:
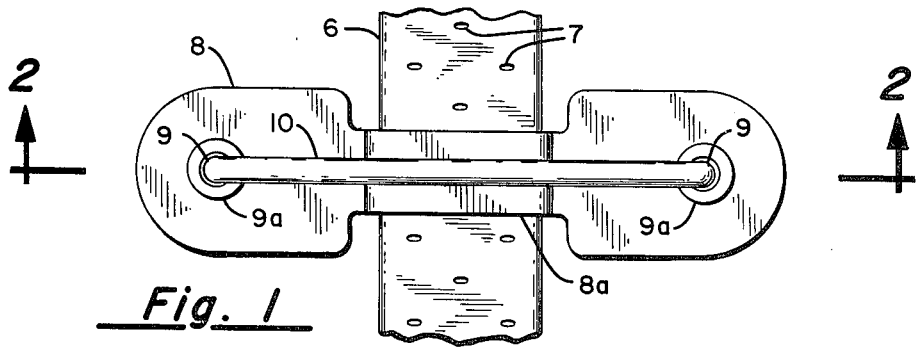
FIGURE 1 is a plan view of a device embodying my invention, together with a fragmentary portion of a hose in operative relation thereto.
Figure 2:
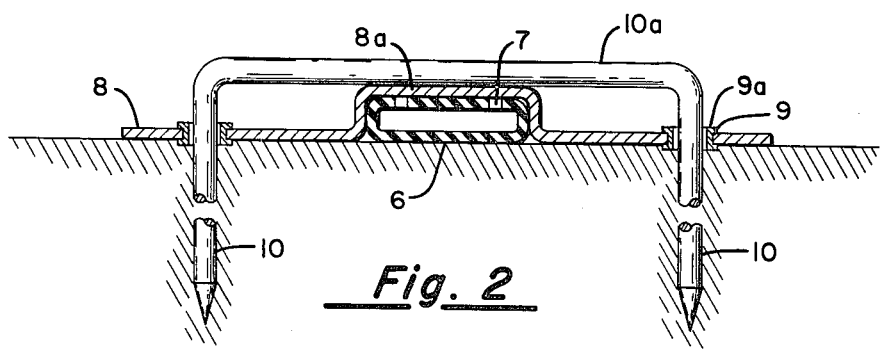
FIG. 2 is a vertical sectional view taken on the line 2—2 of FIG. 1.
Figure 5:
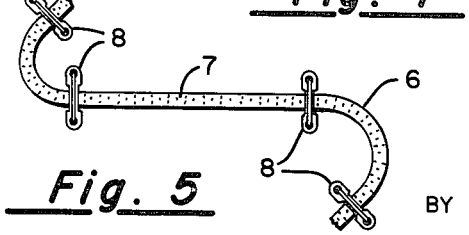
FIG. 5 is a plan view showing a section of the hose having portions held in flat curved positions by a plurality of my improved holders.

In the drawing, a flexible garden and lawn hose of common type is indicated by the numeral 6. This hose is of the soaker type having a multiplicity of spray apertures 7 formed in the normally upper side thereof. In FIGS. 1, 2 and 5 substantially rigid holders of substantial width are indicated generally by the numeral 8. These holders extend crosswise of the hose, are preferably formed with hose-confining central portions 8a and are adapted to be placed in selected positions along the hose. The portions 8a extend across the top surface of the hose as indicated in FIG. 2. A pair of perforations 9 are formed in each of the holders 8 at locations spaced laterally from the hose and grommets 9a may be used to define the perforations 9.

To anchor the holders 8 and hose in selected positions, ground penetrating members indicated generally by the numeral 10 are provided. These members are adapted to be inserted through the openings 9 into the ground. The members 10 are preferably formed integrally with a cross member 10a so that the anchoring members are generally of inverted U-shape and the cross member 10a may be pressed against the upper surface of the portion 8a of the holder 8.

Figure 3:
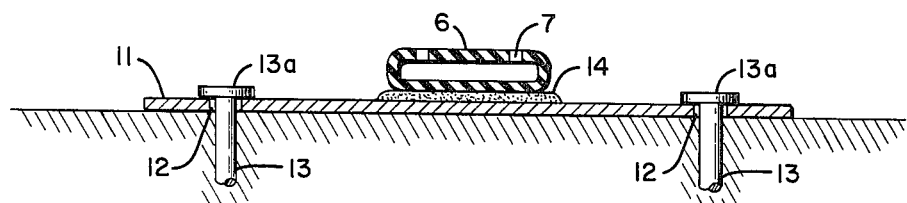
FIG. 3 is a vertical sectional view showing a modification of the device shown in FIGS. 1 and 2.

In the modification of the invention shown in FIG. 3, the device may comprise a substantially rigid elongated support member 11 of substantial width formed with perforations 12 at opposite sides of the hose to receive ground penetrating members 13. These members have heads 13a adapted to engage the member 11 at the periphery of the perforations 12 to anchor the member 11 in selected positions. Ordinary nails of suitable size, e.g., 4–5-inch length, may be used as the ground penetrating members 13. A layer 14 of adhesive may be used to secure the supporting members 11 to the hose in suitably spaced positions along the hose 6.

Figure 4:
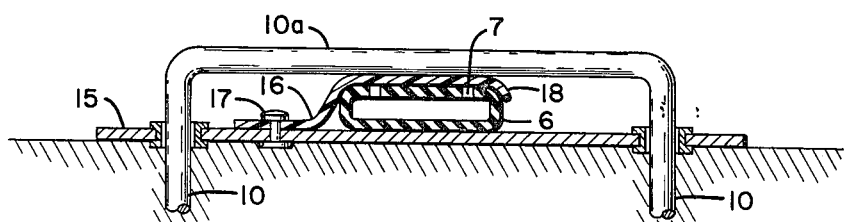
FIG. 4 is a fragmentary sectional view showing a further modification of the invention.

According to the further modification shown in FIG. 4 supporting and holding members 15 similar to the members 11 may be used with ground penetrating members like the members 10 shown in FIGS. 1 and 2 or members 13 of FIG. 3. The hose may be held in selected positions on each member 15 by a spring clip 16 connected at one end by suitable means such as a rivet 17 to the member 15 and having a free end 18 formed to confine the hose and adapted to be sprung away from the member 15 to release the hose. Each spring clip is normally biased to confine the hose on the supporting member 15 but facilitates changing of the position of the holder along the hose.

It may also be feasible to provide laterally projecting holders which are integral with and spaced along the hose in suitable locations so that selected holders may be anchored where required by the use of ground penetrating members.

The several holding and supporting members are preferably formed from a plastic material, synthetic resin or rubber having sufficient rigidity and wide enough so that when laid flat on soft ground the force exerted by the hose in its tendency to tilt from the desired flat position will be effectively resisted when anchored by the ground penetrating members. These low cost devices are thus effective to retain a hose of the class described in any desired curvilinear pattern on the ground and with the spray apertures directed upwardly.

I claim:

1. A holder for a flexible lawn and garden hose of the soaker type having a multiplicity of spray apertures formed in the normally upper side thereof comprising; an elongated substantially rigid supporting member of substantial width disposable crosswise of a hose and adapted to be secured thereto at a selected location along said hose, said supporting member being formed with a perforation adjacent to each end of said supporting member; and a ground penetrating substantially "U" shaped anchor member having prongs inserted through said perforations, said anchor member having a cross member adapted to engage said supporting member and adapted to confine a hose in a selected position.

2. A holder for a flexible lawn and garden hose of the soaker type having a multiplicity of spray apertures formed in the normally upper side thereof, the improvement which comprises; a holding and supporting member disposable crosswise of a hose and having ground engaging portions of substantial width longitudinally thereof, said member being disposable at a selected location along a hose, said holding and supporting member having a perforation adjacent to at least one end, and a ground penetrating member inserted through said perforation for engaging and confining said holding and supporting member in a selected position.

3. A holder for a hose in accordance with claim 2 in which said supporting member is extendable across the upper side of the hose to retain it against lateral tilting relative to said ground engaging portion of said supporting member.

4. A holder for a hose in accordance with claim 2 in which said holding and supporting member is extendable across the lower side of the hose, and means on said supporting member for securing the lower side of the hose in contact with the upper side of said supporting member.

5. A holder for a hose in accordance with claim 2 in which said supporting member includes portions extendable across the upper and lower sides of the hose, whereby to be slidable along the hose to selected positions.

6. A holder for a hose in accordance with claim 4 in which said means for securing the lower side of the hose in contact with the upper side of said supporting member comprise a spring clip adapted to be sprung away from the supporting member.

7. A holder for a hose in accordance with claim 2 in which said holding and supporting member is integral with and projects laterally from both sides of a hose.

References Cited by the Examiner
UNITED STATES PATENTS

| | | | |
|---|---|---|---|
| 728,834 | 5/1903 | Baker | 248—361 |
| 1,363,967 | 12/1920 | Fulton | 239—276 |
| 1,722,197 | 7/1929 | Carnoe | 248—156 X |
| 2,703,890 | 3/1955 | Rinaldy | 5—337 |
| 2,883,247 | 4/1959 | Thompson | 248—156 |
| 2,954,194 | 9/1960 | Alfano | 248—75 |
| 3,091,401 | 5/1963 | Hruby | 239—276 |

FOREIGN PATENTS 776,921  6/1957  Great Britain.

CLAUDE A. LE ROY, *Primary Examiner.*